(12) United States Patent
Dice et al.

(10) Patent No.: US 8,776,063 B2
(45) Date of Patent: Jul. 8, 2014

(54) METHOD AND SYSTEM FOR HARDWARE FEEDBACK IN TRANSACTIONAL MEMORY

(75) Inventors: David Dice, Foxboro, MA (US); Kevin E. Moore, San Francisco, CA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 966 days.

(21) Appl. No.: 12/324,109

(22) Filed: Nov. 26, 2008

(65) Prior Publication Data

US 2010/0131953 A1    May 27, 2010

(51) Int. Cl.
*G06F 9/46* (2006.01)
*G06F 13/00* (2006.01)
*G06F 13/28* (2006.01)
*G06F 9/48* (2006.01)

(52) U.S. Cl.
CPC ............... *G06F 9/466* (2013.01); *G06F 9/467* (2013.01); *G06F 9/4843* (2013.01); *G06F 9/4881* (2013.01)
USPC ............................ 718/101; 718/102; 711/168

(58) Field of Classification Search
None
See application file for complete search history.

(56) References Cited

U.S. PATENT DOCUMENTS

| 5,428,761 A | 6/1995 | Herlihy et al. | |
|---|---|---|---|
| 6,449,700 B2 * | 9/2002 | Hagersten et al. | 711/152 |
| 6,735,760 B1 | 5/2004 | Dice | |
| 7,395,382 B1 * | 7/2008 | Moir | 711/147 |
| 7,856,537 B2 * | 12/2010 | Kumar et al. | 711/152 |
| 2006/0282476 A1 * | 12/2006 | Dolby et al. | 707/201 |
| 2007/0156994 A1 * | 7/2007 | Akkary et al. | 711/167 |
| 2007/0283060 A1 * | 12/2007 | Aizawa | 710/104 |
| 2009/0133032 A1 * | 5/2009 | Biles et al. | 718/106 |
| 2009/0138890 A1 * | 5/2009 | Blake et al. | 718/106 |

FOREIGN PATENT DOCUMENTS

JP          2000322397 A  * 11/2000  ............ G06F 15/177

OTHER PUBLICATIONS

Damron et al, "Hybrid Transactional Memory," Oct. 2006, ASPLOS '06, pp. 336-346.*

(Continued)

*Primary Examiner* — Lewis A Bullock, Jr.
*Assistant Examiner* — Kevin X Lu
(74) *Attorney, Agent, or Firm* — Robert C. Kowert; Meyertons, Hood, Kivlin, Kowert & Goetzel, P.C.

(57) ABSTRACT

Multi-threaded, transactional memory systems may allow concurrent execution of critical sections as speculative transactions. These transactions may abort due to contention among threads. Hardware feedback mechanisms may detect information about aborts and provide that information to software, hardware, or hybrid software/hardware contention management mechanisms. For example, they may detect occurrences of transactional aborts or conditions that may result in transactional aborts, and may update local readable registers or other storage entities (e.g., performance counters) with relevant contention information. This information may include identifying data (e.g., information outlining abort relationships between the processor and other specific physical or logical processors) and/or tallied data (e.g., values of event counters reflecting the number of aborted attempts by the current thread or the resources consumed by those attempts). This contention information may be accessible by contention management mechanisms to inform contention management decisions (e.g. whether to revert transactions to mutual exclusion, delay retries, etc.).

20 Claims, 3 Drawing Sheets

(56) References Cited

OTHER PUBLICATIONS

Saha et al., "Architectural Support for Software Transactional Memory," 2006, Micro '06.*
McDonald et al., "Architectural Semantics for Practical Transactional Memory," May 2006, ISCA '06.*
Richard M. Yoo, "Adaptive Transaction Scheduling for Transactional Memory System—A Thesis," May 2008, arch.ece.gatech.edu/pub/yoo.pdf.*
Ravi Rajwar, "Speculation-Based Techniques for Transactional Lock-Free Execution of Lock-Based Programs—A dissertation," 2002, citeseerx.ist.psu.edu/viewdoc/summary?doi=10.1.1.13.987.*
Ni et al., "Design and IMplementation of Transactional Constructs for C/C++", Oct. 2008, OOPSLA'08.*
David Dice, et al., "Applications of the Adaptive Transactional Memory Test Platform," 2008, 10 pages.
Michael A. Bender, et al., Adversarial Contention Resolution for Simple Channels, SPAA 2005, ACM, 8 pages, 2005.
M. L. Scott and W. N. Scherer III, "Scalable Queue-Based Spin Locks with Timeout," 8th ACM PPoPP, 2001.
Herlihy, et al., "Transactional Memory: Architectural Support for Lock-Free Data Structures," Proc. 20th Annual International Symposium on Computer Architecture, pp. 289-300, May 1993.
Scherer, III, et al., "Advanced Contention Management for Dynamic Software Transactional Memory," Proc. of the 24th Annual ACM Symposium on Principles of Distributed Computing, 2005, pp. 240-248.
Guerraoui, et al., "Robust Contention Management in Software Transactional Memory," Proc. of the OOPSLA 2005 Workshop on Synchronization and Concurrency in Object-Oriented Languages, 2005.
Ansari, et al., "Adaptive Concurrency Control for Transactional Memory," 2008, 12 pages.
Attiya, et al., "Transactional contention management as a non-clairvoyant scheduling problem", ACM, 2006, pp. 308-315.
Rajwar, et al., "Speculative Lock Elision: Enabling HIghly Concurrent Multithreaded Execution," Appears in the Proceedings of the 34th International Symposium on Microarchitecture (MICRO), Dec. 3-5, 2001, Austin, TX, 12 pages.
Rajwar, et al., "Transactional Lock-Free Execution of Lock-Based Programs," Appears in the Proc. of the 10th International Conf. on Architectural Support for Programming Languages and Operating Systems (ASPLOS), Oct. 6-9, 2002, San Jose, CA, 13 pages.
Martinez, et al., "Speculative Synchronization: Applying Thread-Level Speculation to Explicitly Parallel Applications," ASPLOS X 10:/02, San Jose, CA, 2002 ACM ISBN 1-58113-574-2/02/0010 . . . , 12 pages, 2002.
Hammond, et al., "Transactional Memory Coherence and Consistency," ISCA-31, 2004, 12 pages, 2004.
Posva, et al., "Speculative Locking—Breaking the Scale Barrier," JavaOne, Sun's 2005 Worldwide Java Developer Conference, 37 pages, 2005.
O. Agesen, et al., "An efficient meta-lock for implementing ubiquitous synchronization," ACM SIGPLAN International Conference on Object-Oriented Programming Systems, Languages and Applications (OOPSLA), 1999.
Dave Dice, "Implementing Fast Java Monitors with Relaxed-Locks," USENIX JVM'01, 13 pages, 2001.
Adam Welc, et al, "Transactional Monitors for Concurrent Objects," ECOOP'04, 24 pages, 2004.
Adam Welc, et al, "Transparently Reconciling Transactions with Locking for Java Synchronization," ECOOP'04, 26 pages, 2004.
Dice, et al., "Transactional Locking II," DISC 2006, 15 pages, 2006.
Wikipedia, "Carrier sense multiple access with collision detection," last updated Feb. 12, 2009, en.wikipedia.org/wiki/Carrier_sense_multiple_access_with_collision_detection, 2 pages, 2009.
Wikipedia, "Admission Control," last updated Dec. 14, 2008, http://en.wikipedia.org/wiki/Admission_control, 1 page, 2008.
Wikipedia, "Carrier sense multiple access with collision avoidance," last updated Feb. 14, 2009, en.wikipedia.org/wiki/Carrier_sense_multiple_access_with_collision_avoidance, 14 pages, 2009.
Keir Fraser, "Practical Lock-Freedom," Ph. D. Dissertation—King's College, Univerity of Cambridge, 2003. (Final version, Feb. 2004), 116 pages, 2003.
U.S. Appl. No. 12/325,870, filed Dec. 1, 2008.
U.S. Appl. No. 11/967,371, filed Dec. 31, 2007.
U.S. Appl. No. 12/327,659, filed Dec. 3, 2008.
J. Mellor-Crummey and M. Scott, "Algorithms for scalable synchronization on shared-memory multiprocessors," ACM Transactions on Computer Systems, 9(1), 1991.
Wikipedia, "Truncated binary exponential backoff," last updated Apr. 13, 2008, en.wikipedia.org/wiki/Truncated_binary_exponential_backoff, 1 page.
Lev, "PhTM: Phased Transactional Memory," Transact 2007, 11 pages, 2007.
Pang, et al., "Performance Evaluation of an Adaptive Backoff scheme for WLAN,"Wireless Communications and Mobile Computing, 2004, 13 pages, 2004.
Yoo, et al., "Adaptive Transaction Scheduling for Transactional Memory Systems," Georgia Institute of Technology, CERCS;GIT-CERCS-07-04, 2007.

* cited by examiner

METHOD AND SYSTEM FOR HARDWARE FEEDBACK IN TRANSACTIONAL MEMORY

BACKGROUND OF THE INVENTION

1. Field of the Invention

This invention relates generally to multi-threaded computer systems and, more specifically, to a system and method for utilizing hardware feedback in transactional memory systems.

2. Description of the Related Art

Due to the complexity and energy concerns of modern processors, traditional approaches to boosting CPU performance have become difficult and ineffective. Instead of attempting to drive up clock speeds, computer architects are increasingly turning to multi-threading techniques such as symmetric multi-threading or multi-core architectures. In order to leverage these new architectures, software engineers must write applications that execute using multiple concurrent threads of execution. Unfortunately, correct multi-threaded programming is notoriously difficult using traditional language constructs.

Shared-memory systems allow multiple threads to access and operate on the same memory locations. To maintain consistency, threads must often execute a series of instructions as one atomic block, or critical section. As used herein, a critical section may refer to a code path or a set of program instructions protected by a given lock. In these cases, care must be taken to ensure that other threads do not observe memory values from a partial execution of such a block. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, race conditions, priority inversions, software complexity, and performance limitations. Locking entire critical sections is a heavy-handed approach to concurrency control.

Alternatively, it may be possible to increase parallelism by allowing multiple threads to execute a critical section at one time if the executions do not rely on overlapping memory locations. This may increase performance and mitigate or eliminate many of the pitfalls normally associated with traditional locking mechanisms. However, such unconstrained and race-prone executions are not guaranteed to be correct.

Transactional memory is a mechanism that can be leveraged to enable concurrent and correct execution of a critical section by multiple threads. Transactional memory allows a thread to execute a block of instructions as a transaction, that is, either completely and atomically or not at all. The instructions are executed and then either "committed", allowing the aggregate effect to be seen by all other threads, or "aborted", allowing no effect to be seen. A transaction that has committed successfully may be said to have "succeeded". Transactional lock-elision (TLE) is a technique that allows multiple threads to execute a critical section concurrently and transactionally without acquiring and holding a lock. It provides identical semantics to traditional mutual exclusion but allows threads to execute critical sections as transactions that can be aborted if a conflict occurs. Aborted transactions may be retried by the thread later. TLE may be distinguished from speculative lock elision (SLE), in that TLE requires explicit recoding of existing lock sites to use checkpoint and commit style instructions that indicate the beginning and end of a given transaction. Managed runtime environments such as Java™ Virtual Machines (JVMs) with just-in-time compilers (JITs) may transform existing synchronized blocks via TLE. Similarly, SPARC binaries that may call locking services in system modules via dynamic linking, may also benefit from TLE.

Unfortunately, it is possible that repeated transactional aborts may lead to serious performance degradation. In the case of two or more concurrent transactions causing mutual aborts, the system could achieve even worse performance under a TLE policy than under traditional mutual exclusion.

SUMMARY

Hardware feedback mechanisms may detect information about transactional aborts and provide that information, or data derived from that information, to software contention management mechanisms. The feedback may convey transactional contention information regarding physical processors, logical processors, threads, transactions, or any other software abstractions. For example, the hardware feedback mechanisms may detect the occurrence of a transactional abort or a condition that may result in a transactional abort and may update local readable registers or other readable storage entities (e.g., performance counters) with relevant contention information. The software readable storage entities may be on any processor or off-chip (e.g., in memory accessible by one or more processors in the system).

Hardware feedback mechanisms may collect information that may include identifying data and/or tallied data. Identifying data may include information outlining abort relationships between at least two specific physical or logical processors. Tallied data may include values of event counters, such as those counting the number of aborted attempts by the current thread, or measures of resources consumed by those attempts. Such contention information may then be accessed by software contention management mechanisms to inform contention management decisions.

In one example, when a transaction aborts, hardware mechanisms on the executing processor may write to a local register, the CPUID of at least one of the processors that caused the abort. Similarly, when a processor causes a remote transaction to abort, hardware mechanisms may write to a local register, the CPUID of the processor whose transaction was aborted. In another example, hardware mechanisms may update a performance counter each time execution causes a remote transaction to abort.

Transactional memory systems may be implemented such that they utilize existing cache coherence mechanisms. Embodiments deployed on such systems may utilize information in the cache coherence messages to extract contention data. For example, in various embodiments, when a processor receives a cache block invalidate message and subsequently aborts, hardware mechanisms may update a local register with the CPUID of the sending processor. In other embodiments, block invalidation acknowledgement messages may be leveraged to tally the number of remote transactions aborted due to local execution. Alternatively, invalidation acknowledgement messages may be leveraged by hardware mechanisms to record the CPUID of the processor that most recently aborted a transaction due to local execution.

In some embodiments, information may be added to cache coherence messages to allow richer hardware feedback. For example, a "T-bit" may be included in an acknowledgment message to indicate whether the invalidated cache block was read as part of a currently active transaction. A system capable of speculative execution may set an S-bit for cache blocks modified by speculative execution. Transactional memory systems that set the S-bit to indicate a block's involvement in a currently active transaction, may add the S-bit to acknowledgement messages. Hardware feedback mechanisms may utilize the S-bit in a manner similar to a T-bit.

Hardware mechanisms may thus provide feedback to software contention management. The feedback may convey transactional contention information regarding physical processors, logical processors, threads, transactions, or any other software abstractions.

Figure 1:
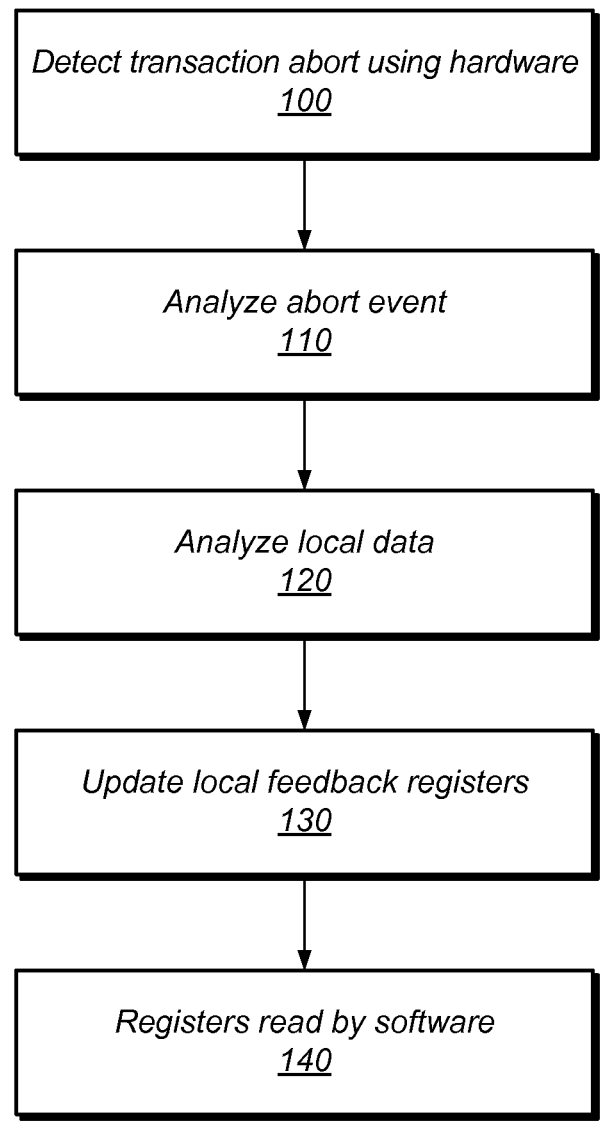
FIG. 1 is a flowchart illustrating one embodiment of a method of using hardware to provide feedback of contention information to software components.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

To achieve high performance or other system goals, multi-threaded transactional memory systems may employ some form of contention management among threads. For example, an aborted transaction may be retried using mutual exclusion or via transactional lock elision after some delay. In this example, the decisions to retry a transaction, whether to do so using mutual exclusion, and/or how long to delay before making another transactional attempt, may be determined by contention management mechanisms. These mechanisms may take many forms, including thread-local backoff schemes, global thread cooperation, coordination through a central manager, or others. Though several example embodiments described herein include a software-based central contention manager, those skilled in the art will appreciate that the techniques described herein may be applicable to any software-based, hardware-based, or hybrid software/hardware contention management mechanisms, including local ones.

In various embodiments, a contention manager may make, or assist with making, any of the decisions described above. For example, in response to a high level of contention on a given critical section, a contention manager may reduce concurrency over the section by retrying failed transactions only after some delay. Alternatively, in response to repeated failed attempts to execute a given transaction, a contention manager may decide that the transaction should be executed using mutual exclusion rather than TLE. In making such determinations, a contention manager may in some embodiments utilize information regarding the various transactions executing on the system and the correlations between them. Such data may be broadly referred to herein as contention data.

In various embodiments, hardware mechanisms and constructs may be provided that provide contention data to software components such as contention managers. These constructs and mechanisms, referred to herein as hardware feedback, may communicate relevant contention data to software components by placing such data in one or more storage entities. The term storage entity, as used herein, may refer to any hardware structure on a processor or accessible by a processor, that is capable of storing data, and whose stored values can be read by software. Examples of storage entities may include registers, performance counters, on-chip or off-chip caches, dynamic memory, static memory, or any other program instruction readable structures.

As noted above, in various embodiments a system may employ one or more hardware feedback mechanisms to gather and provide different types of contention data about each processor, including identifying data and tallied data, as described below:

Identifying Contention Data—This may include any information outlining abort relationships between the processor and at least one other specific physical or logical processor. For example, data indicating that a transaction executed by the processor caused an abort of a transaction being executed by another particular processor (e.g., one having a CPUTD value of 3), may be considered identifying information.

Tallied Contention Data—This may include any information that tallies contention related events for the processor. Such tallies may include the number of aborts over time, the number of aborts by other processors caused by this processor over time, the resources consumed in executing one or more transactions, or other measures relevant to contention management decisions. For example, tallied data may include the number of transactions that have aborted due to execution by the processor.

Using the hardware feedback such as that described above, software mechanisms (e.g. contention managers) may, in some embodiments, derive yet more finely grained information. For example, in one embodiment, software may clear or reset (e.g. to a default value) some or all contention data from relevant storage entities before the start of each transaction. Doing so may allow hardware feedback constructs to effectively reflect a single transaction. In another embodiment, software may read hardware feedback values at the start and end of a transaction rather than clearing or resetting them between transactions. Software mechanisms may also use hardware feedback when collecting contention data on the level of threads or that of any other software abstraction. Software may thereby use hardware feedback to obtain contention data regarding particular processors, threads, transactions, or other relevant entities.

In various embodiments, identifying contention data may be used by a software contention manager. For example, a contention manager may observe an aggregation of identifying abort data and detect complex relationships between the aborts. In one such use, if interference cycles develop (e.g. transaction A aborts transaction B which aborts transaction C which aborts transaction A), numerous and repeated aborts may result. By collecting and observing aggregated identifying contention data, a contention manager may identify such degenerate situations and take appropriate action. Such action may entail executing one or more of the involved transactions using mutual exclusion, delaying one or more of the transactions, or any other contention management policy.

The contention manager may aggregate contention data in numerous internal variables or data structures. These may include one or more graph data structures. A graph data structure, as used herein and in the art of computer science and mathematics, may refer abstractly to an entity comprising one or more vertices (a.k.a. nodes, points), connected by one or more edges (a.k.a. lines, arcs) to denote relationships between the vertices. Edges may have orientation (i.e. directed graphs) and/or weights. A contention manager may build a killed-by graph comprising multiple vertices, each representing a transaction, thread, and/or processor; and multiple directed edges between the vertices indicating abort relationships (e.g. an edge from node A to node B may indicate that B has aborted due to A). A weighted graph may be used to denote multiple aborts. For example, in response to transaction A causing an abort of transaction B, the contention manager may increment the weight of the edge between the vertex representing A and that representing B. It should be noted that a graph is an abstract mathematical concept and that implementation in software may take many forms. For example, an object-oriented data structure may comprise multiple instances of vertex and edge object types. Alternatively, a two dimensional array of Boolean values (graph[x][y]) may be used to denote a graph, by setting graph[n][m] to true if and only if an edge exists from node n to node m. Many such techniques are known in the art.

By building a killed-by graph or equivalent structure that captures information about transactions that have aborted each other, a contention manager may identify degenerate situations, such as repeating interference/abort cycles as may be indicated by cycles in a killed-by graph, and take appropriate corrective action. For instance, in the above example, a contention manager may determine that the execution of transaction A should proceed using mutual exclusion, rather than TLE, in order to allow progress to be made.

In some embodiments, a contention manager may utilize tallied data in addition to, or instead of, identifying data when making contention mitigation decisions. For example, if tallied data indicates that a particular transaction has a high probability of aborting, even with very little concurrency, it may be considered sensitive to contention. Alternatively, if tallied data indicates that a particular transaction is likely to cause other transactions to abort, it may be considered highly interfering. In such cases, a contention manager may take appropriate action, for example, by delaying a highly interfering transaction disproportionately. To avoid starvation of a highly sensitive thread, a contention manager may instruct the thread to acquire a lock rather than make repeated attempts to elide the lock. In some embodiments, it may be possible to identify sensitive or interfering threads without identifying data. For example, a transaction that has caused many other transactions to abort may be identified as interfering, even if the identities of the aborted transactions are unknown.

Tallied data may in some embodiments reflect one or more measurements of resource consumption, which may be considered by a contention manager when making decisions. Broadly, a transaction that consumes a high level of resources before aborting may be more detrimental to the system than one that consumes fewer resources per attempt. For example, if tallied data indicates that transaction A tends to abort after 10,000 clock cycles while transaction B does so after only 1,000 cycles, then the contention manager may choose to enact a more conservative execution policy towards the execution of transaction A than towards that of B, due to the higher performance penalty likely to be caused by an abort of transaction A. For example, the contention manager may determine that A should execute using mutual exclusion rather than TLE, due to its high cost of failure. Alternatively, to reduce the probability of A aborting, the contention manager may restrict the total number of threads permitted to concurrently elide the same lock as A. In other embodiments, following an abort of transaction A, A may be retried using TLE only after a given delay interval. Because of the stiffer penalty for failure, that interval may be longer than a delay interval during which B may be required to wait before retrying after failing.

One embodiment of a method for hardware feedback of contention information is illustrated in FIG. 1. In this example, the method may begin with hardware detecting an abort event, as in 100. In various embodiments, this event may have occurred on the local or a remote processor. In another embodiment, the method may be initiated by a transactional event other than an abort. For example, the method may be invoked in response to the start or successful commitment of a transaction.

In the example illustrated in FIG. 1, the hardware may analyze the abort event, as in 110. This analysis may include a determination of the cause for the abort. In various embodiments, it is possible that aborts may be caused by a variety of factors, including contention with other threads, time-outs, context switches, or transactionally infeasible instructions (e.g. I/O). Hardware feedback may follow different execution paths depending on such data. For example, if the abort was caused by contention, hardware feedback may extract identifying information about the event, such as the memory address causing the conflict (e.g., the address of a shared memory location that is a target of contention), and/or the identity of the responsible processor, thread, and/or transaction.

The hardware may also gather and analyze data from local processor storage entities, as in 120, and use it to derive event data or provide context to other event data. For example, when a transaction begins, hardware mechanisms may record in a local register S, the value of a local performance counter C, that counts CPU cycles. If the transaction is aborted, the hardware feedback mechanism may read the value of C, subtract from it the value in S, and write the result to some third register (as in 130), where it may be accessed by a contention manager, as in 140. As in the previous example, analysis of abort events and/or local data, the hardware feedback mechanism may update local registers or other local storage entities with identifying and/or tallied contention data regarding the abort event, as in 130.

Contention information may be stored on any combination of the storage entities. In various embodiments, any number of data may be stored in any number of storage entities. For example, in some embodiments, each contention datum may be written into its own special-purpose register on the local processor. In other embodiments, several data may be stored in a single register. For example, the bits of a register may be partitioned into regions, each reserved for, or understood by the reading software entity as, a separate datum of contention information. Note that any suitable scheme may be used for encoding several data into a single register. Further, data in a given storage entity may also reference one or more other storage entities. For example, in one embodiment, the value of a 1-bit register may indicate whether a specific contention datum may be found in one or two 32-bit registers.

In some embodiments, contention data may coexist in storage entities alongside non-contention related data. For example, a processor's local memory cache may be augmented to attach a few bits of contention data to each cache block or to the whole cache.

In some embodiments, the mechanisms described herein may be deployed on simultaneous multi-threading (SMT) processors, which are capable of executing multiple threads concurrently by using multiple logical processors. In such embodiments, it may be desirable to concurrently store contention data for each logical processor. In one embodiment, this may be done by replicating the storage entities or sections of those entities for each logical processor. In some embodiments, full replication of storage entities may not always be necessary, since storage entities may store multiple data elements, belonging to one or more logical processors, concurrently. For example, a 32-bit register used to store the CPUID of the processor responsible for the most recent abort may not need to be replicated for each logical processor. Rather, the CPUID relevant to a first logical processor may reside in the first sixteen bits of the register while the CPUID relevant to a second logical processor may be represented by the latter 16 bits.

Figure 2:
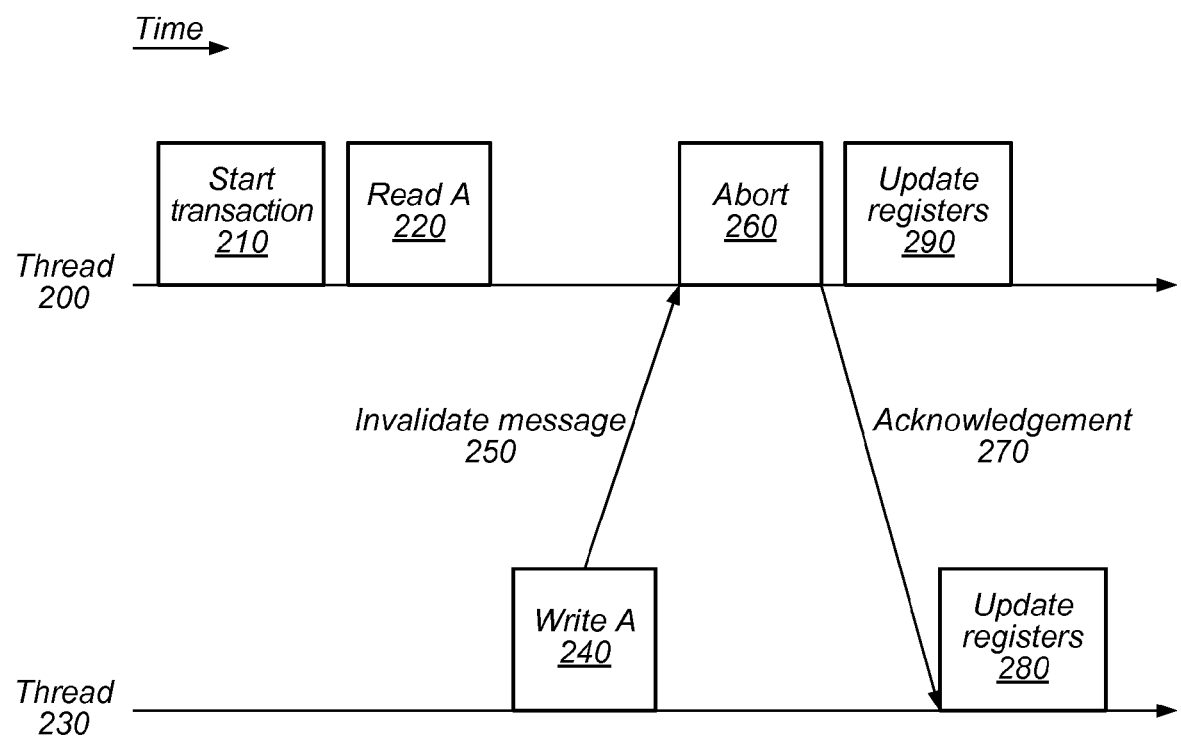
FIG. 2 is diagram illustrating one example of hardware contention feedback. The diagram illustrates the execution events of, and messages exchanged between, two threads over time, according to one embodiment.

As previously noted, transactional memory systems may, in some embodiments, be built using hardware cache coherence protocols. In such embodiments, cache coherence messages, such as those invalidating local cache blocks, may be used to implement the transactional memory system. For example, a transactional memory system may detect a cache coherence message indicating that a given cache block has been invalidated. If that cache block has been accessed by an as-yet uncommitted (i.e. currently active) transaction, then the transactional memory system may abort that transaction. In such embodiments, the method may leverage cache coherence messages to implement hardware feedback of contention data. FIG. 2 illustrates an example of such a method, according to one embodiment. This example assumes a hardware transactional memory system that is built on a snoop-based, write-invalidate cache coherence protocol, although the techniques described herein may in general be applicable to systems employing other cache coherence protocols. As used herein, a snoop-based protocol implies that cache coherence messages are broadcast onto a system bus or other broadcast medium connecting some number of processors, and that these connected processors may receive the messages by observing (or "snooping") them on the bus. A write-invalidate protocol implies that when a processor updates a shared memory location, it may broadcast a message on the bus instructing other processors that may be holding a value for that memory location in cache to invalidate that cache block. FIG. 2 illustrates the execution events of, and messages exchanged between, two concurrent threads, each executing on a distinct processor with at least one non-common cache. FIG. 2 presents the events on a horizontal timeline where time moves rightward.

In the illustrated example, Thread 200 begins executing a transaction, as in 210, and subsequently reads memory location A, as in 220, as part of that transaction. Subsequent to the read event 220, thread 230 modifies the data in shared memory location A, as in 240. As per the snoop-based write-invalidate cache coherence protocol, this causes an invalidate message 250 to be broadcast and received by thread 200. In response to receiving invalidate message 250, Thread 200 may consequently abort the currently active transaction started in 210. This is shown as abort event 260. In some embodiments, hardware may extract the sender's processor id (CPUID) from the invalidate message 250 and may store it in a register (as shown at 290), or some other storage entity, as the identity of the most recent remote processor to cause a transactional abort by the local processor. Any number of other contention-related data may be extracted from the message and stored in storage entities. For example, in some embodiments, as a result of receiving invalidate message 250, one or more performance counters may be started, stopped, copied, read, incremented, decremented, or otherwise manipulated. Other storage entities, such as 1-bit registers, may be toggled to indicate various pieces of information. In general, any number of storage entities may be manipulated as a result of abort event 260.

As illustrated in FIG. 2, the cache coherence protocol may call for thread 200 to send an acknowledgement message 270 to thread 230 to acknowledge receipt of the invalidate message 250. In some embodiments, the acknowledgement message 270 may contain an indication of whether the invalidate message 250 caused a transactional abort to occur. For example, in one embodiment, each cache block in a processor's local cache may include a "T-bit" which may hold a value of 0 or 1. If the cache block has been read as part of a currently active transaction, then the T-bit may be set to 1. Otherwise, it may be set to 0. Thread 200 may include the T-bit value of the invalidated cache line with the acknowledgement message 270, thereby communicating to thread 230, that its write of A, as in 240, may have triggered an abort, as in 260.

Some transactional memory systems may exploit existing speculative execution mechanisms, for example, setting an S-bit to flag not only each cache line used by speculative execution, but also those used by currently active, uncommitted transactions. In such systems, it may be possible for the acknowledgement message 270 to include the value of an S-bit rather than, or in addition to, the value of a T-bit. While this technique may result in some false positives, as when failed speculative execution may occasionally be identified as contentious, this form of hardware feedback may still be useful. Note that in other embodiments, acknowledgement of an abort may be done in a message separate from the acknowledgement message of an underlying cache coherence protocol.

In some embodiments, hardware may analyze the acknowledgment message 270 to determine if an abort was triggered by the message. In some embodiments, this analysis may involve examining the values of the T-bit or the S-bit encoded in the message. As above, the hardware may then manipulate the values of any number of registers and/or other storage entities to reflect contention data (as in 280). For example, in one embodiment, the hardware may extract the CPUID of the sender from the acknowledgement message and record it in a register or other storage entity as the identity of the most recent remote processor that aborted a transaction due to the execution of the local processor. As part of the register updates 280, a performance counter may be incremented to reflect the number of remote transactions that the local processor caused to abort.

The example illustrated in FIG. 2 reflects only one embodiment of using the mechanisms and techniques disclosed herein and many other variations are possible. In various embodiments, any of the execution events depicted in FIG. 2 may be reordered or removed while others may be added. For example, the invalidate message 250 may be sent before, after, or concurrently with the write of A, as shown in 240. Likewise, the acknowledgement message 270 may be sent before, after, or concurrently with the abort event pictured in 260. In some transactional memory systems, an invalidate message, such as 250, may cause affected transactions to abort immediately while in other systems, it may cause them to abort when they attempt to commit. Different embodiments may function correctly under these or other suitable policies.

While FIG. 2 illustrates a hardware feedback mechanism that utilizes the messages of a snoop-based, write-invalidate protocol, other embodiments may be adapted to other systems and/or protocols. For example, in a system that employs a write-update protocol, the invalidate message 250 may be replaced with an update message. Some embodiments may be configured to use such an update message analogously to the invalidate message 250 described herein. Other hybrid or "adaptive" systems may employ both invalidate and update messages. Again, various embodiments may be adapted to treat these messages similarly.

In various embodiments, the mechanisms described herein may be adapted to systems utilizing cache coherence schemes that are directory-based rather than snoop-based. Instead of broadcasting cache coherence messages, directory-based schemes may use a central or distributed directory as an intermediary for coherence messages. To implement hardware feedback in directory-based systems, the messages sent by directories may be augmented to include abort information in a manner analogous to the above-described message augmentation for snoop-based protocols. The use of central, flat, hierarchical, or other directory types may not significantly alter the implementation of the mechanisms described herein. In various embodiments, the mechanisms may also be adapted to directory-based cache coherence systems with write-invalidate or write-update policies in a manner analogous to those described for snoop-based protocols.

Various types of contention data may be collected and provided to contention management mechanisms by hardware feedback mechanisms, in different embodiments. The following examples describe embodiments in which such data is stored in registers, but it should be understood that any processor storage entity, or storage entity accessible to a processor in the system, may be used instead of, or in conjunction with, registers to store contention data. In one embodiment, hardware mechanisms may use one or more registers on a local processor to store information usable to identify the remote processor responsible for the most recent transactional abort executed by the local processor. In some embodiments, this identifying information may include the CPUID. In alternative embodiments, registers may store information not only regarding the most recent abort, but regarding previous aborts as well. This history may be arbitrarily long in different embodiments. As discussed above, the contention data may be partitioned, combined, and/or dispersed among any number of registers via register replication or various encoding schemes. In other embodiments, a register or set of registers on a local processor may be used to store the identity of the remote processor that most recently aborted a transaction due to execution by the local processor.

As previously noted, in some embodiments, a readable performance counter may be used to tally the number of remote transactions that have aborted due to the execution of the local processor. In other embodiments, a readable performance counter may be used to tally various resources consumed by one or more recent transactions. For example, in one embodiment, the performance counter may report the number of clock cycles used for the most recently aborted transaction. In another embodiment, the performance counter may report the number of clock cycles used cumulatively by all attempts to execute a particular transaction. Such metrics may enable a contention manager to calculate the average number of cycles wasted by attempts to execute a given transaction. Other resources consumed by one or more transactional attempts may also be tracked with performance counters. Such resource may include the number of instructions, memory operations, cache misses, etc.

For each of the examples above, the register or set of registers used by the hardware feedback mechanisms may be replicated for each physical or logical processor. In some embodiments, the data contained in these registers may be saved and restored between context switches. In other embodiments, the data in the registers may persist across context switches. As described earlier, each of these embodiments may also track contention data using processor storage entities other than registers, including memory or specialized on-chip hardware structures.

Figure 3:
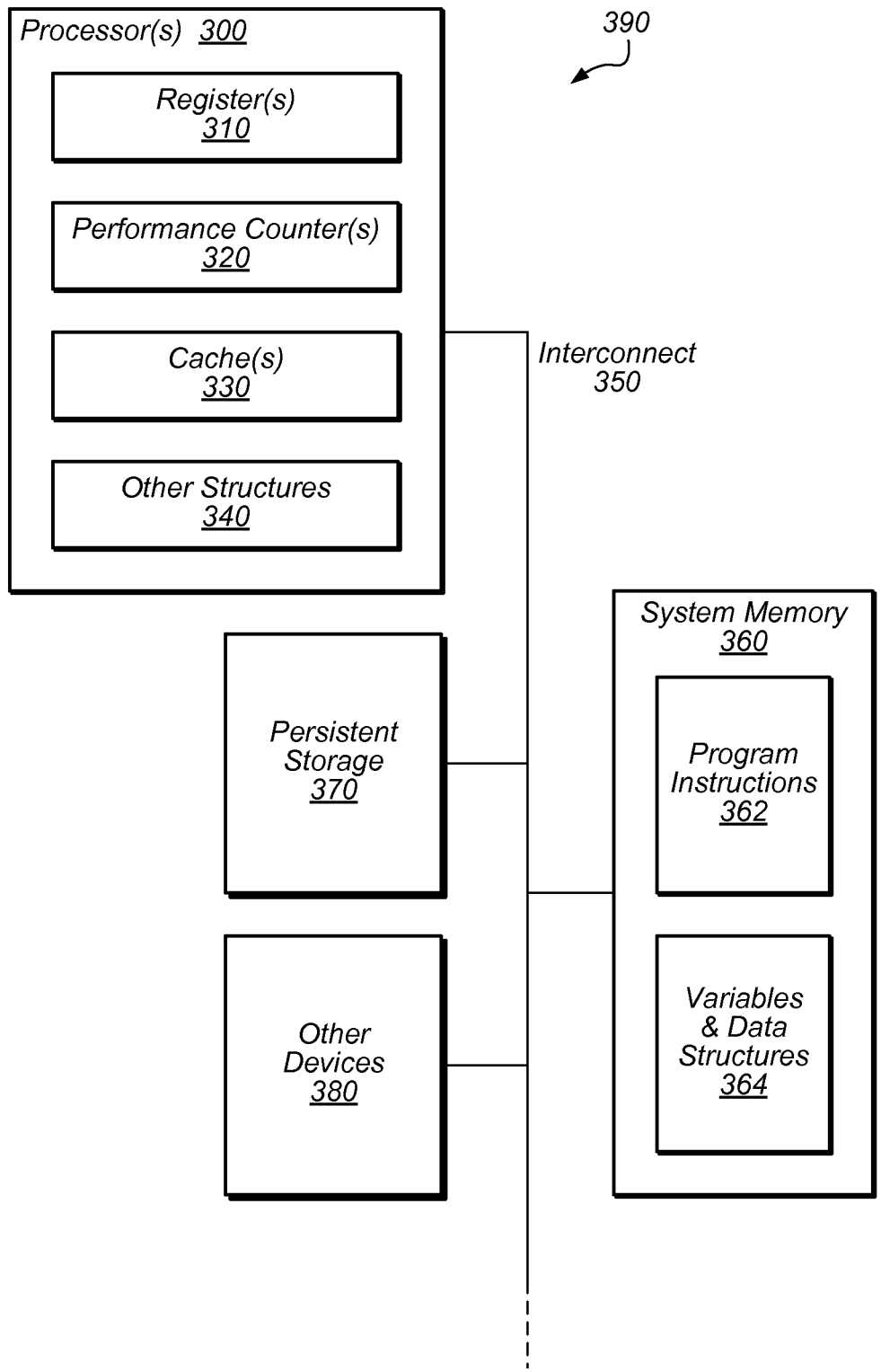
FIG. 3 is a block diagram illustrating a computer system configured to implement hardware feedback to software contention management, in accordance with one or more embodiments.

FIG. 3 illustrates one embodiment of a computer system 390 configured to implement hardware feedback of contention data as described herein. The computer system may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The illustrated embodiment comprises one or more processors 300, each possibly containing multiple cores. Each processor may be capable of simultaneous multi-threading (SMT), in which case, it may comprise two or more logical processors. In this example, each processor comprises one or more registers 310, each of which comprises a given number of bits. Common sizes of registers may be 8, 16, 32, and 64 bits, although other numbers are possible. As used herein, the term register may refer to a programmer-visible register that may be read by software.

Each processor 300 illustrated in FIG. 3 may also comprise one or more performance counters 320, which may be implemented as special purpose registers. In various embodiments, these performance counters may be programmer-visible registers, readable by software. Performance counters 320 may be configured to tally and hold values reflecting system performance measurements and/or resource usage measurements, such as those described herein. Each processor 300 may also comprise one or more memory caches 330 as well as any number of other hardware structures 340 (e.g. translation look-aside buffer, etc).

The computer system 390 may also include one or more persistent storage devices 370 (e.g. optical storage, magnetic storage, hard drive, tape drive, solid state memory, etc) and one or more system memories 360 (e.g., one or more of cache, SRAM, DRAM, RDRAM, EDO RAM, DDR 10 RAM, SDRAM, Rambus RAM, EEPROM, etc.). In various embodiments, computer system 390 may also include fewer or additional components not illustrated in FIG. 3 (e.g., video cards, audio cards, additional network interfaces, peripheral devices, a network interface such as an ATM interface, an Ethernet interface, a Frame Relay interface, a hardware-based contention management mechanism, etc.).

One or more of the system memories 360 may contain program instructions 362. Program instructions 362 may comprise one or more applications, shared libraries, operating systems, or contention managers as described herein. Program instructions 362 may be encoded in platform native binary, any interpreted language such as Java™ byte-code, or in any other language such as C/C++, Java™, etc or any combination thereof. The program instructions 362 may include transactional memory support configured to provide functions, operations and/or other processes for implementing memory contention management as described herein. Such support and functions may exist in one or more shared libraries, operating systems, contention managers, or applications. Note that program instructions 362 may include support for a hybrid contention management mechanism (i.e., one in which some functionality is provided by executable program instructions and other functionality is provided by one or more hardware elements). The system memory may further comprise memory locations 364 for storing shared and private variables and other data structures, such as a killed-by graph structure.

The system components, including the processors 300, persistent storage devices 370, and memories 360, may be connected via one or more interconnects 350. Interconnect 350 may be implemented as any broadcast, point-to-point, or hybrid communication mechanism such as a front side bus, Ethernet, InfiniBand™, etc.

Although the embodiments above have been described in considerable detail, numerous variations and modifications will become apparent to those skilled in the art once the above disclosure is fully appreciated. For example, although many of the embodiments are described in terms of TLE, it should be noted that the techniques and mechanisms disclosed herein may be applicable in other contexts in which transactions are used. One example may be supporting programming languages that provide atomic blocks implemented as transactions. It is intended that the following claims be interpreted to embrace all such variations and modifications.

What is claimed:

1. A computer-implemented method, comprising:
   initiating execution of a thread on a processor in a transactional memory system; the thread attempting execution of a transaction;
   a hardware mechanism detecting an abort event for the transaction, wherein said detecting an abort event comprises detecting that the transaction has aborted or will abort;
   in response to said detecting, the hardware mechanism providing information about the detected abort event to a contention management mechanism wherein said providing comprises updating a value stored in a register on the processor on which the thread is attempting execution of the transaction whose value explicitly identifies a processor that caused an abort event with a value that identifies a processor that caused the detected abort event; and
   the contention management mechanism making a contention management decision dependent, at least in part, on the information about the detected abort event that is provided by the hardware mechanism, wherein said making a contention management decision comprises determining an action to be taken in response to the detected abort event, and wherein said determining an action comprises determining, dependent on the information about the detected abort event, whether to retry execution of the transaction using transactional lock elision or to attempt execution of the transaction using mutual exclusion.

2. The method of claim 1, wherein the information provided to the contention management mechanism comprises one or more of: identifying contention data or tallied contention data.

3. The method of claim 2, wherein the identifying contention data comprises the updated value of the register, and wherein the updated value comprises one or more of: an identifier of the processor on which the thread is attempting execution of the transaction or an identifier of a remote processor that caused the transaction to abort.

4. The method of claim 2, wherein the tallied contention data comprises one or more of: a number of attempts to execute transactions in the transactional memory system, a number of transactions aborted in the transactional memory system, a number of transactions executing on the processor on which the thread is attempting execution of the transaction that have been aborted, a number of transactions the processor on which the thread is attempting execution of the transaction has caused to abort on a remote processor, an amount of resources consumed by attempts to execute transactions on the processor on which the thread is attempting execution of the transaction, or an amount of resources consumed by attempts to execute transactions in the transactional memory system.

5. The method of claim 1, wherein said providing comprises updating a value stored in each of one or more storage entities that are accessible by the contention management mechanism, and wherein the one or more storage entities comprise the register on the processor on which the thread is attempting execution of the transaction.

6. The method of claim 5, wherein the one or more storage entities comprise two or more storage entities, and wherein the two or more storage entities comprise the register on the processor on which the thread is attempting execution of the transaction and further comprise one or more of: a register on a remote processor, a performance counter on the processor on which the thread is attempting execution of the transaction, a performance counter on a remote processor, a storage location in a shared memory accessible by the processor on which the thread is attempting execution of the transaction, or a storage location in a shared memory accessible by a remote processor.

7. The method of claim 1, wherein the information is dependent, at least in part, on information contained in a cache coherence message.

8. The method of claim 7, wherein the cache coherence message comprises a cache block invalidate message or a response to a cache block invalidate message.

9. The method of claim 7, wherein the cache coherence message comprises an indication of whether an invalidated cache block was read, or may have been read, by a transaction that has not yet committed.

10. The method of claim 1, wherein said making a contention management decision comprises:
    the contention management mechanism storing, aggregating, or analyzing the information provided by the hardware mechanism.

11. The method claim of 1, wherein said making a contention management decision comprises:
    generating one or more graph data structures dependent on the information provided by the hardware mechanism.

12. The method of claim 1, wherein the processor on which the thread is attempting execution of the transaction is a logical processor.

13. A system, comprising:
    one or more processors in a transactional memory system;
    a hardware mechanism configured to:
        detect abort events, wherein detecting abort events comprises detecting that transactions have aborted or will abort; and
        provide information about transactions that have aborted or will abort to a contention management mechanism, wherein to provide the information, the hardware mechanism is configured to update a value stored in a register on at least one of the one or more processors whose value explicitly identifies a processor that caused an abort event with a value that identifies a processor that caused a detected abort event;

a memory coupled to the one or more processors and storing memory instructions to implement:

initiating execution of a thread on one of the one or more processors in the transactional memory system;

the thread attempting execution of a given transaction;

the contention management mechanism obtaining information provided by the hardware mechanism about an abort event that was detected during the attempt to execute the given transaction on the one of the one or more processors; and the contention management mechanism making a contention management decision dependent, at least in part, on the information about the detected abort event that is provided by the hardware mechanism, wherein said making a contention management decision comprises determining an action to be taken in response to the detected abort event, and wherein said determining an action comprises determining, dependent on the information about the detected abort event, whether to retry execution of the given transaction using transactional lock elision or to attempt execution of the given transaction using mutual exclusion.

14. The system of claim 13, wherein the information provided to the contention management mechanism comprises one or more of: identifying contention data or tallied contention data.

15. The system of claim 13, wherein said providing comprises updating a value stored in each of one or more storage entities that are accessible by the contention management mechanism, and wherein the one or more storage entities comprise the register on the one of the processors.

16. The system of claim 13, wherein the information provided by the hardware mechanism is dependent, at least in part, on information contained in a cache coherence message.

17. The system of claim 16, wherein the cache coherence message comprises one or more of: a cache block invalidate message, a response to a cache block invalidate message, an indication of whether an invalidated cache block was read by a transaction that has not yet committed, or an indication of whether an invalidated cache block may have been read by a transaction that has not yet committed.

18. The system of claim 13, wherein said making a contention management decision comprises:

the contention management mechanism storing, aggregating, or analyzing the information provided by the hardware mechanism.

19. The system claim of 13, wherein said making a contention management decision comprises:

generating one or more graph data structures dependent on the information provided by the hardware mechanism.

20. The system of claim 13, wherein the one of the one or more processors is a logical processor.

* * * * *

UNITED STATES PATENT AND TRADEMARK OFFICE
CERTIFICATE OF CORRECTION

| | | |
|---|---|---|
| PATENT NO. | : 8,776,063 B2 | Page 1 of 1 |
| APPLICATION NO. | : 12/324109 | |
| DATED | : July 8, 2014 | |
| INVENTOR(S) | : Dice et al. | |

It is certified that error appears in the above-identified patent and that said Letters Patent is hereby corrected as shown below:

On the Title Page, References Cited

On page 2, column 1, under Other Publications, line 34, delete "Hlghly" and insert -- Highly --, therefor.

On page 2, column 2, under Other Publications, line 26, delete "Univerity" and insert -- University --, therefor.

In the Specification

Column 4, line 34, delete "CPUTD" and insert -- CPUID --, therefor.

In the Claims

Column 12, line 51, in Claim 11, delete "method claim of" and insert -- method of claim --, therefor.

Column 14, line 22, in Claim 19, delete "system claim of" and insert -- system of claim --, therefor.

Signed and Sealed this
Twenty-fourth Day of February, 2015

Michelle K. Lee
*Deputy Director of the United States Patent and Trademark Office*